(12) United States Patent
Pollman

(10) Patent No.: US 6,904,997 B2
(45) Date of Patent: Jun. 14, 2005

(54) COMPACT VEHICLE TRANSMISSION

(75) Inventor: Frederic W. Pollman, Eden Prairie, MN (US)

(73) Assignee: Sauer-Danfoss, Inc., Ames, IA (US)

( * ) Notice: Subject to any disclaimer, the term of this patent is extended or adjusted under 35 U.S.C. 154(b) by 29 days.

(21) Appl. No.: 10/097,797

(22) Filed: Mar. 14, 2002

(65) Prior Publication Data
US 2002/0183155 A1 Dec. 5, 2002

Related U.S. Application Data
(60) Provisional application No. 60/294,689, filed on May 31, 2001.

(51) Int. Cl.[7] .............................................. B60K 17/00
(52) U.S. Cl. ........................................ 180/374; 475/82
(58) Field of Search ................................ 180/291, 292, 180/297, 312, 53.1, 369, 908, 372, 374, 376; 74/730.1, 733.1; 475/73, 74, 78, 79–82

(56) References Cited

U.S. PATENT DOCUMENTS

| | | | |
|---|---|---|---|
| 3,597,998 A | * 8/1971 | Ebert | 475/74 |
| 3,918,325 A | * 11/1975 | Frost | 475/82 |
| 4,341,131 A | 7/1982 | Pollman | |
| 4,354,400 A | * 10/1982 | Baker | 475/74 |
| 4,776,233 A | * 10/1988 | Kita et al. | 475/76 |
| 4,976,664 A | * 12/1990 | Hagin et al. | 475/80 |
| 5,011,463 A | * 4/1991 | Jarchow et al. | 475/74 |
| 5,046,994 A | * 9/1991 | Hasegawa et al. | 475/83 |
| 5,159,855 A | * 11/1992 | Nikolaus et al. | 475/78 |
| 5,403,241 A | * 4/1995 | Jarchow et al. | 475/72 |
| 5,421,790 A | * 6/1995 | Lasoen | 475/78 |
| 5,575,735 A | * 11/1996 | Coutant et al. | 475/72 |
| 5,946,983 A | * 9/1999 | Brambilla | 74/730.1 |
| 5,980,411 A | * 11/1999 | Wontner | 475/76 |
| 6,007,444 A | * 12/1999 | Kinokami | 475/81 |
| 6,044,728 A | * 4/2000 | Pecceu | 74/730.1 |
| 6,283,883 B1 | * 9/2001 | Hammarstrand | 475/72 |
| 6,358,174 B1 | * 3/2002 | Folsom et al. | 475/72 |
| 6,440,026 B1 | * 8/2002 | Johnson et al. | 475/81 |

* cited by examiner

Primary Examiner—Paul N. Dickson
Assistant Examiner—Laura B. Rosenberg

(57) ABSTRACT

A compact vehicle has a frame and an operating position thereon for at least one rider. An engine having a drive shaft is on the frame, as are a plurality of operational wheels. A transmission operatively couples the engine and the wheels. The transmission is a hydrostatic mechanical transmission with at least 2 operational modes.

11 Claims, 9 Drawing Sheets

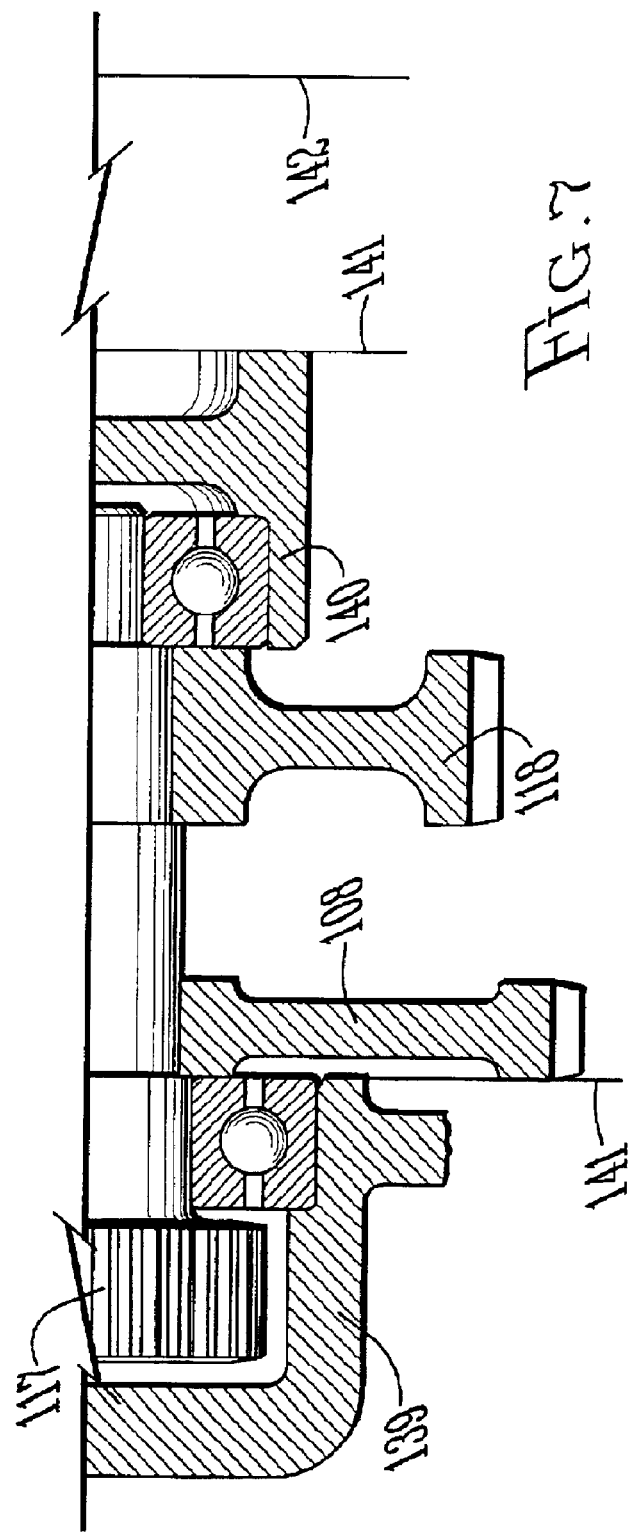

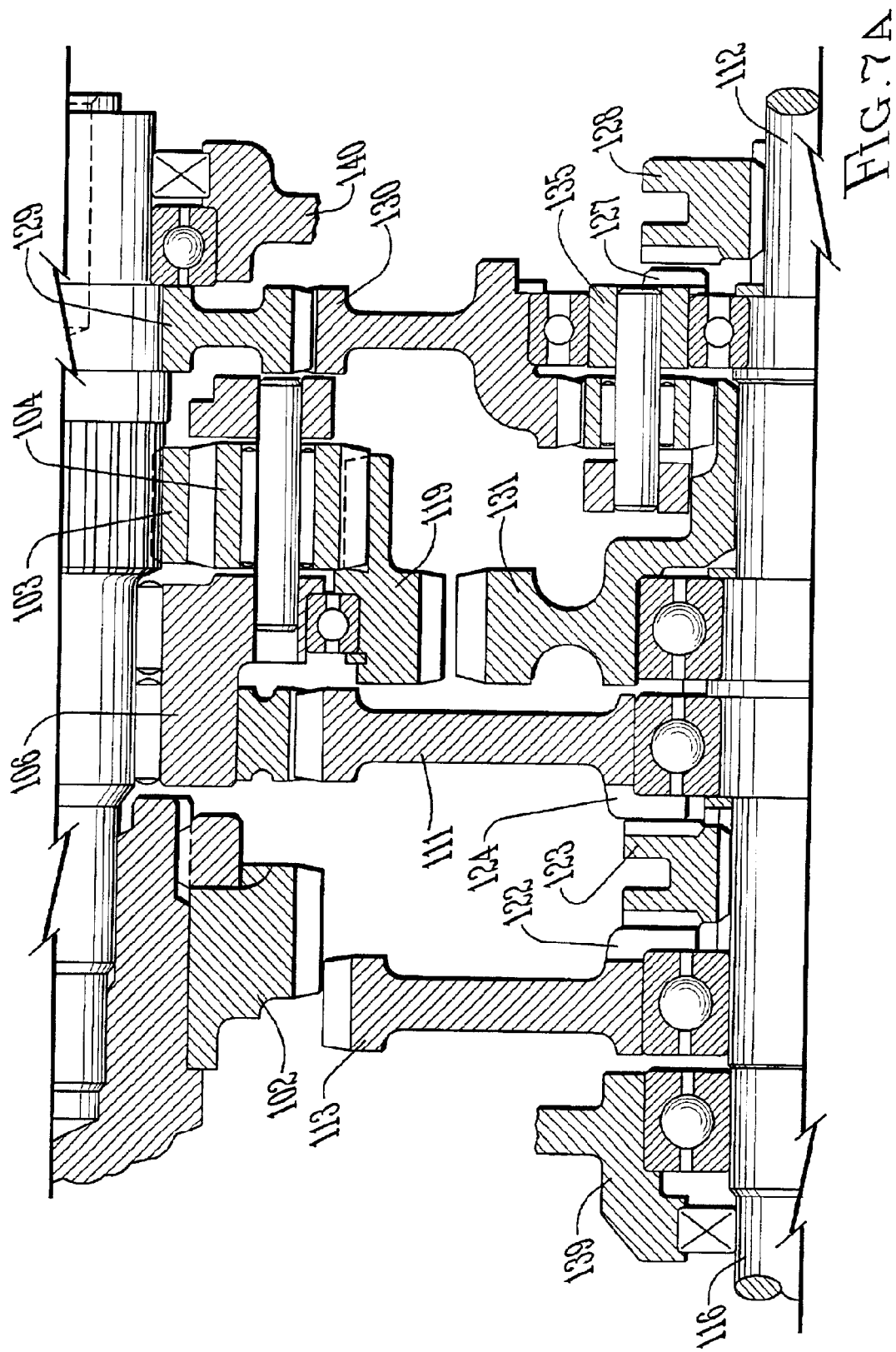

COMPACT VEHICLE TRANSMISSION

CROSS REFERENCE TO A RELATED APPLICATION

This application is a conversion of Provisional Patent Application Ser. No. 60/294,689 filed May 31, 2001.

BACKGROUND OF THE INVENTION

There are a number of compact vehicles that need to have "automatic" transmissions for ease of driving and for increased utility. These include ATV's, tractors, utility work vehicles and small automobiles. These vehicles are generally in the 25 HP to 50 HP range, and have common requirements for low cost, high efficiency, good controllability and continuous ratio change throughout the entire speed range. These vehicles are small and need transmission packages which are short and narrow and which have inputs and outputs conveniently located.

There can be a wide range in the required transmission ratio spread that varies by vehicle vocation. Further, the transmission configuration varies with the specific vehicle design. Both of these issues can be major determinants of cost. There are some differences in engine speed, which can affect the sizing of the transmission components.

Therefore, a principal object of this invention is to provide a hydrostatic mechanical transmission (HMT) which accommodates the range of vehicle heeds with a basic design approach, and provides for the adapting of different vehicle requirements while retaining many key transmission components across a range of vehicles.

Further objects of the invention are as follows:

1. To provide an HMT with a continuous ratio from full reverse to full forward speed in a compact vehicle. Providing controlled output speed through zero eliminates the need for any clutch between the engine and transmission.

2. To provide controlled output speed which can be configured in either a 2-mode or 3-mode version depending in the application requirement. The third mode is independent in ratio spread from the other two modes.

3. To provide a transmission configuration which has a center housing portion which contains features and location for two hydrostatic units which is common across the range of transmission applications, and two end covers for the center portion which contain the features and location for the mechanical shafts, engine mounting, and PTO drive. The housing split lines are located on the front and rear of the V and F hydrostatic assemblies.

4. To provide for the transmission output shaft location to be below and offset to one side of the input shaft, so as to allow for routing of the driveshaft(s) close to the engine, in either an integrated or non-integrated engine/transmission configuration.

Vehicle Background:

The vehicles intended for application of this transmission have a single seat for the driver who typically sits close to the engine/transmission package and may straddle it. The transmission must be compact and allow routing of the driveshaft below/beside the engine. It is desirable to have a continuous ratio throughout the vehicle speed range in order to allow maximum flexibility for the driver or work to be done. Minimum cost is achieved with no gears between the front and rear driveshafts and with no clutch between the engine and transmission.

Transmission Background:

Hydromechanical transmissions are characterized by a hydrostatic transmission power path in parallel with a mechanical power transmission path, arranged in a manner to decrease the average power flow through the hydrostatic portion and thereby increase operating efficiency. Typically, the mechanical power path includes a planetary gear set which acts to sum the power flows at either the input or output end of the transmission.

The existence of parallel power paths creates the possibility of reducing the output speed range or torque ratio in order to further reduce transmitted hydrostatic power; this then requires multiple ranges or "modes" to achieve the full torque and speed range of the transmission. The impact of multiple modes is to improve efficiency and sometimes to reduce cost. In addition to efficiency and cost, the magnitude of the output speed range/torque ratio in each mode has an impact on input power capacity relative to the size of the HST. Smaller ratios allow larger input power for the same size hydrostatic units. It is obvious that more modes allow either smaller mode ratios or larger transmission ratios or both. These relationships create the possibility for having a versatile design configuration that accommodates a number of market needs for input power, ratio range and efficiency.

Since a hydrostatic transmission is a part of the unit, one or more of the modes can be hydrostatic, or without parallel power paths. If there is a hydrostatic mode, it is usually the start-up range, or mode 1.

Multi-mode HMT's are usually accomplished by reusing the hydrostatic components and clutching to a different mechanical component. The mechanical component will be a planetary if the mode is hydromechanical. Usually the modes are arranged so that there is no ratio change during the mode change in order to have continuous speed or torque delivery. Also, the hydrostatic transmission is usually stroked over center from full positive displacement to full negative displacement in order to fully utilize the installed hydrostatic power. When making a mode change, a planetary element different from any other mode must be used if the speed/torque ratio of the mode is to be independently selected from the other modes.

BRIEF DESCRIPTION OF THE DRAWINGS

FIGS. 7 and 7A are partial sectional view of the apparatus of the invention with FIG. 7 showing a lower portion of the structure of the upper portion shown in FIG. 7A;

DESCRIPTION OF THE PREFERRED EMBODIMENT

Figure 1:
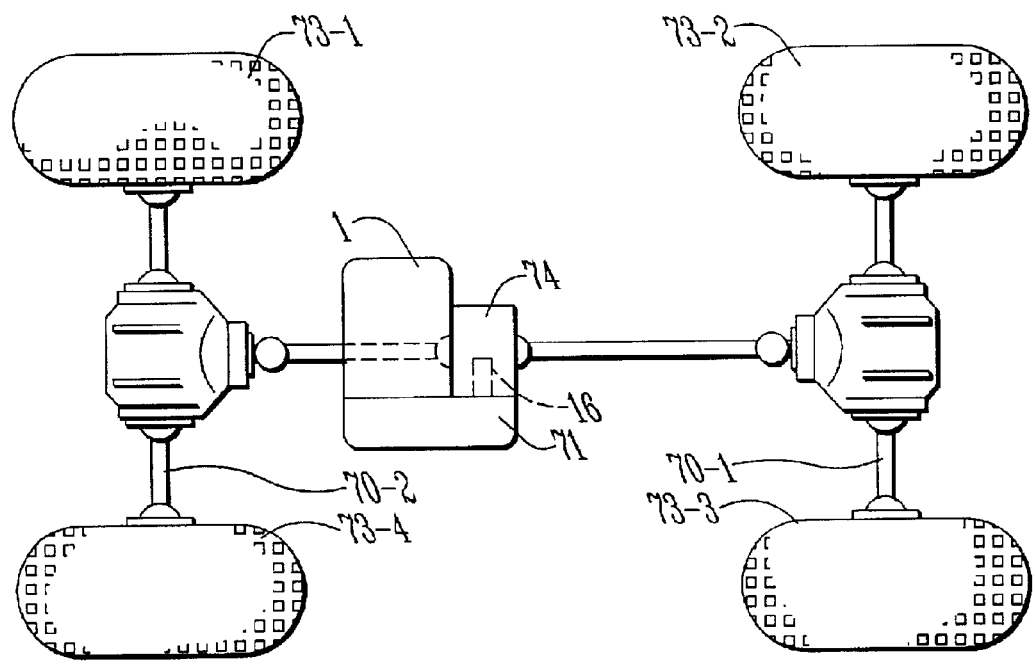
FIG. 1 is a plan view of a vehicle using one form of the invention.

Vehicle installation: Transverse engine (refer to FIG. 1). The engine 1 crankshaft is positioned transversely to the direction of vehicle motion. The transmission 71 is mounted directly to the engine, without any clutch, with the output below and to the side of the engine. The engine/transmission interface may be either integrated or nonintegrated. A right-angle gearbox 74 is connected to the transmission output 16 with connections to one or both axles 70 of the vehicle. In this configuration, the driver typically straddles the engine/transmission package so that short transmission length is important.

Figure 2:
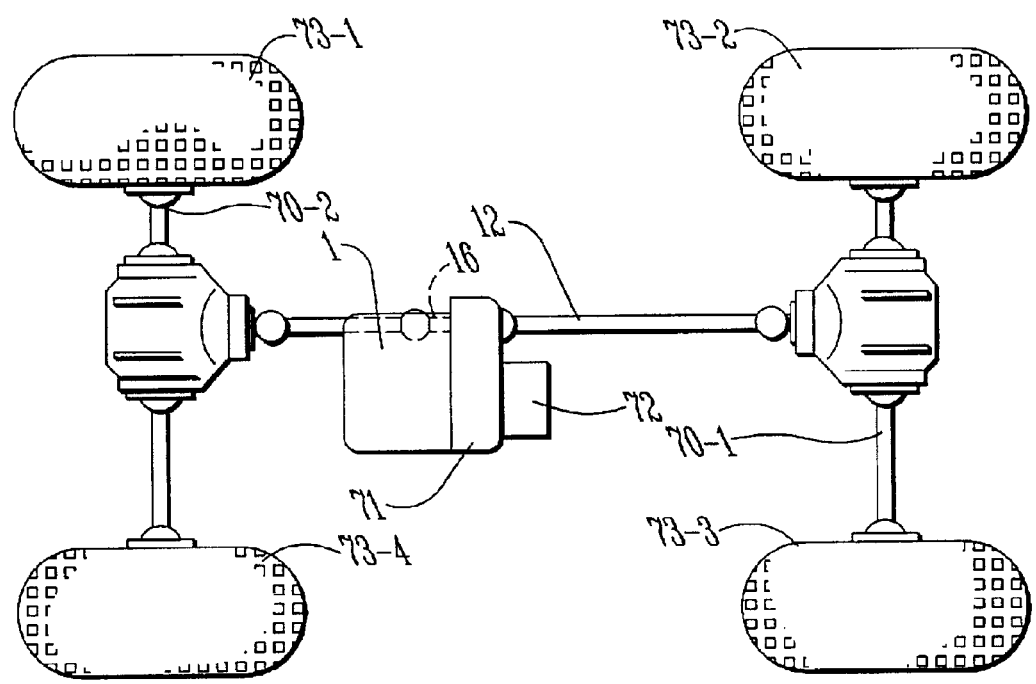
FIG. 2 is a plan view of a vehicle using another form of the invention.

Longitudinal engine (refer to FIG. 2). The engine 1 crankshaft is positioned parallel to the direction of vehicle motion. The transmission 71 is mounted directly to the engine, without any clutch, with the output below and to the side of the engine. The engine/transmission interface may be either integrated or non-integrated. The transmission outputs 16/12 and driveshaft(s) are connected to one or both axles 70 of the vehicle. In this configuration the driver may straddle the engine/transmission package so that narrow width is important. Short length is important so as to allow operator space in front of the engine. FIG. 2 shows a PTO accessory 72 mounted to the face opposite the engine. This could be an auxiliary pump, a hand starter assembly or other engine connected device.

Figure 3:
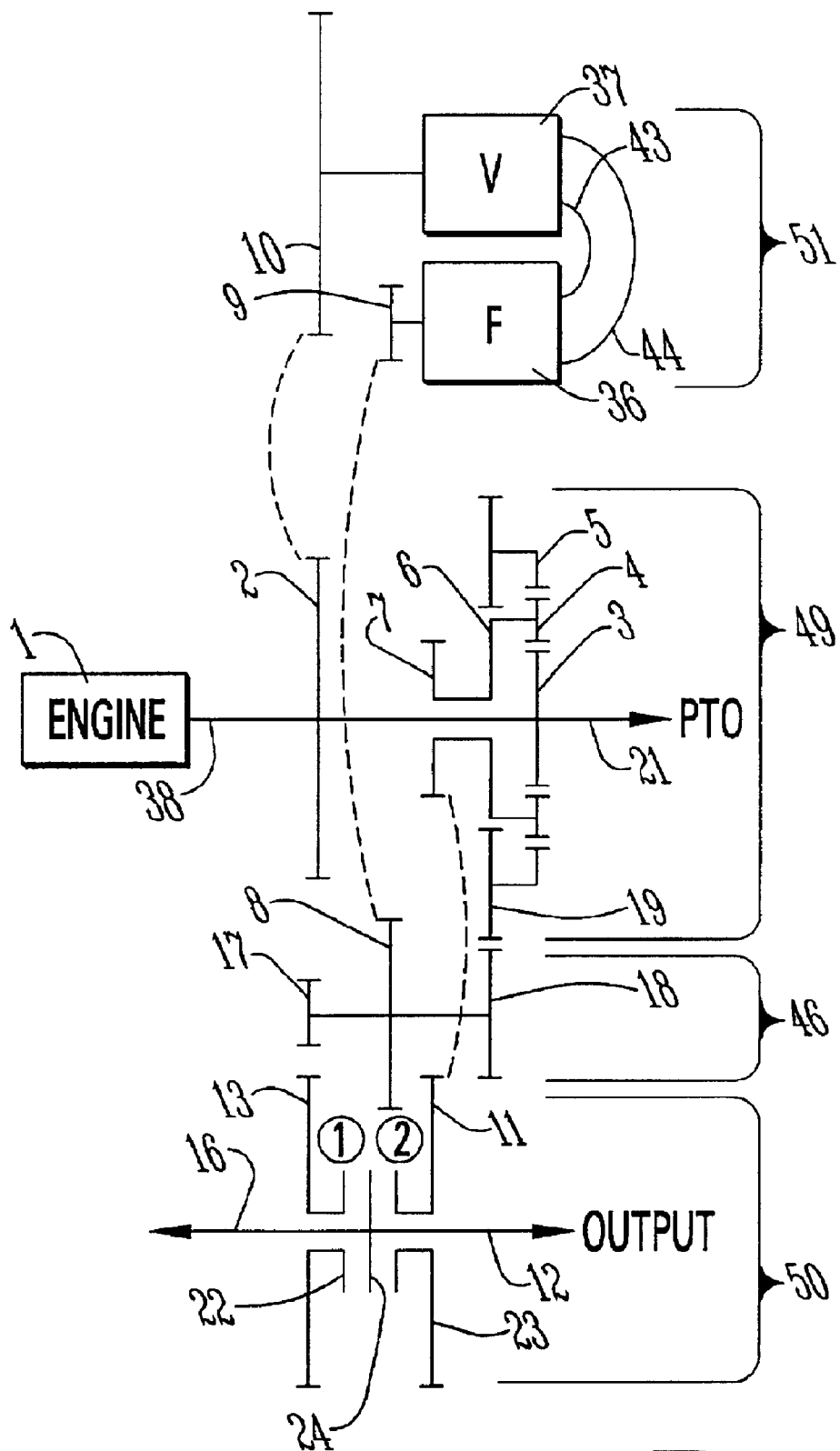
FIG. 3 is a schematic view showing the components of the invention.
Figure 4A:
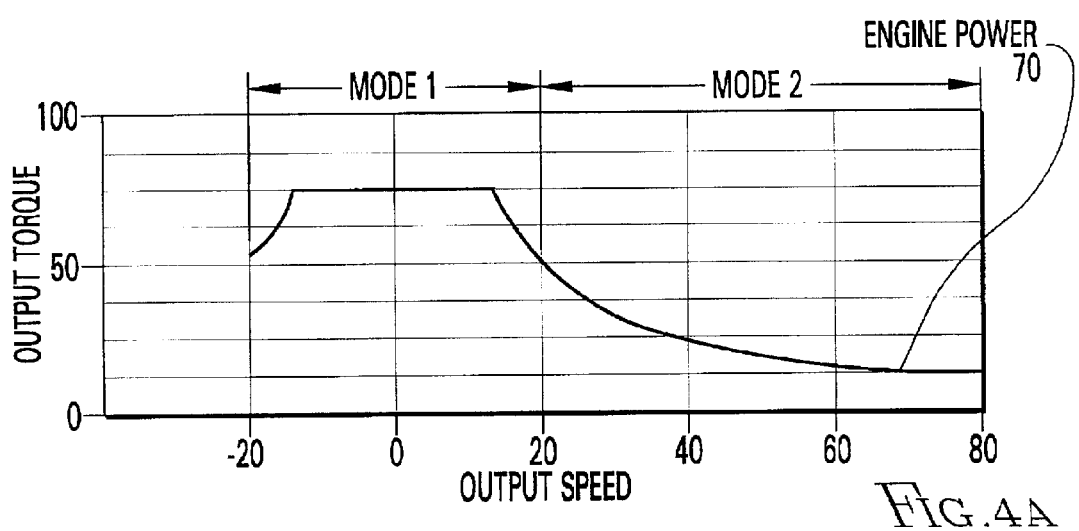
FIGS. 4A–4C are three output speed graphs showing output torque, unit speed, and power, respectively, as reflected in two different modes of operation.
Figure 4B:
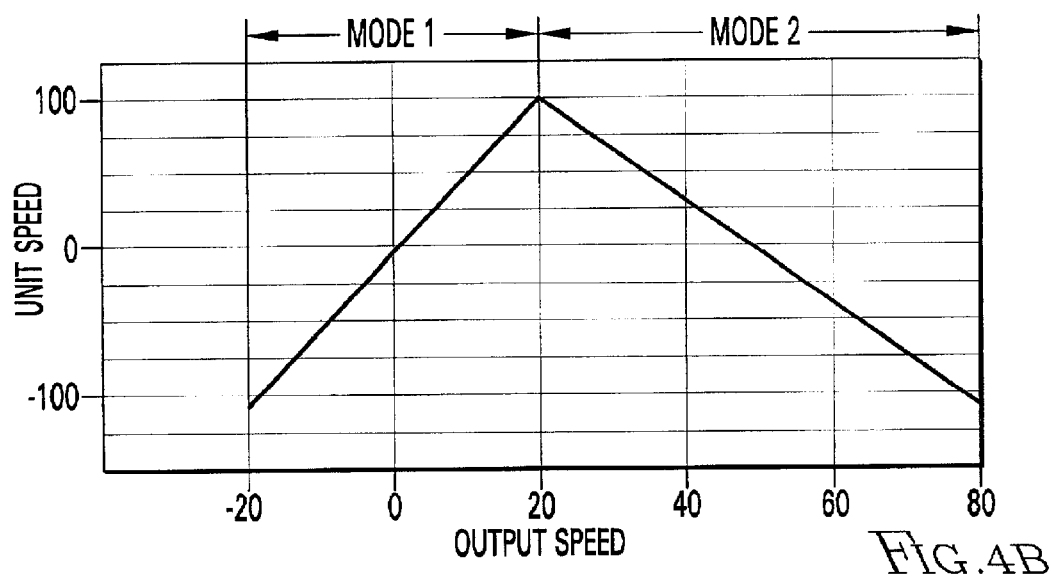
Figure 4C:
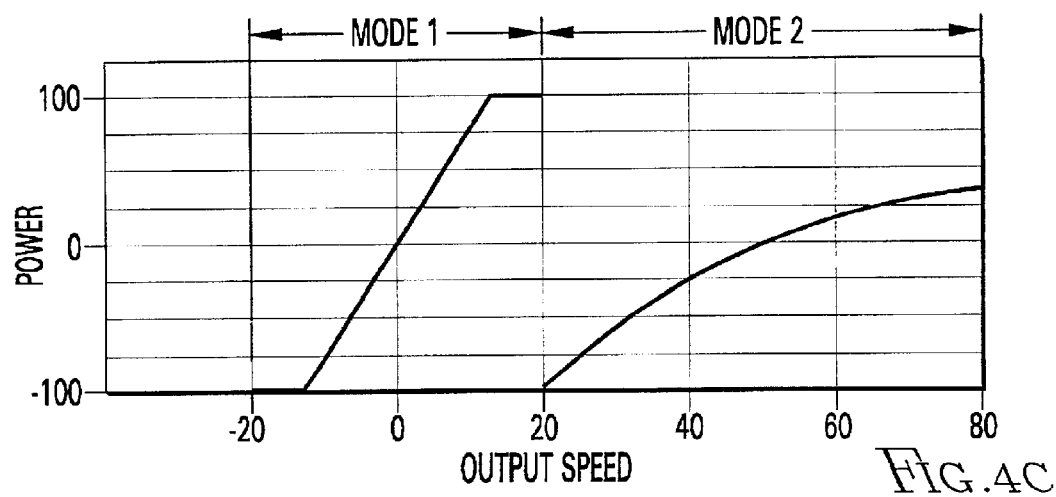
Figure 8:
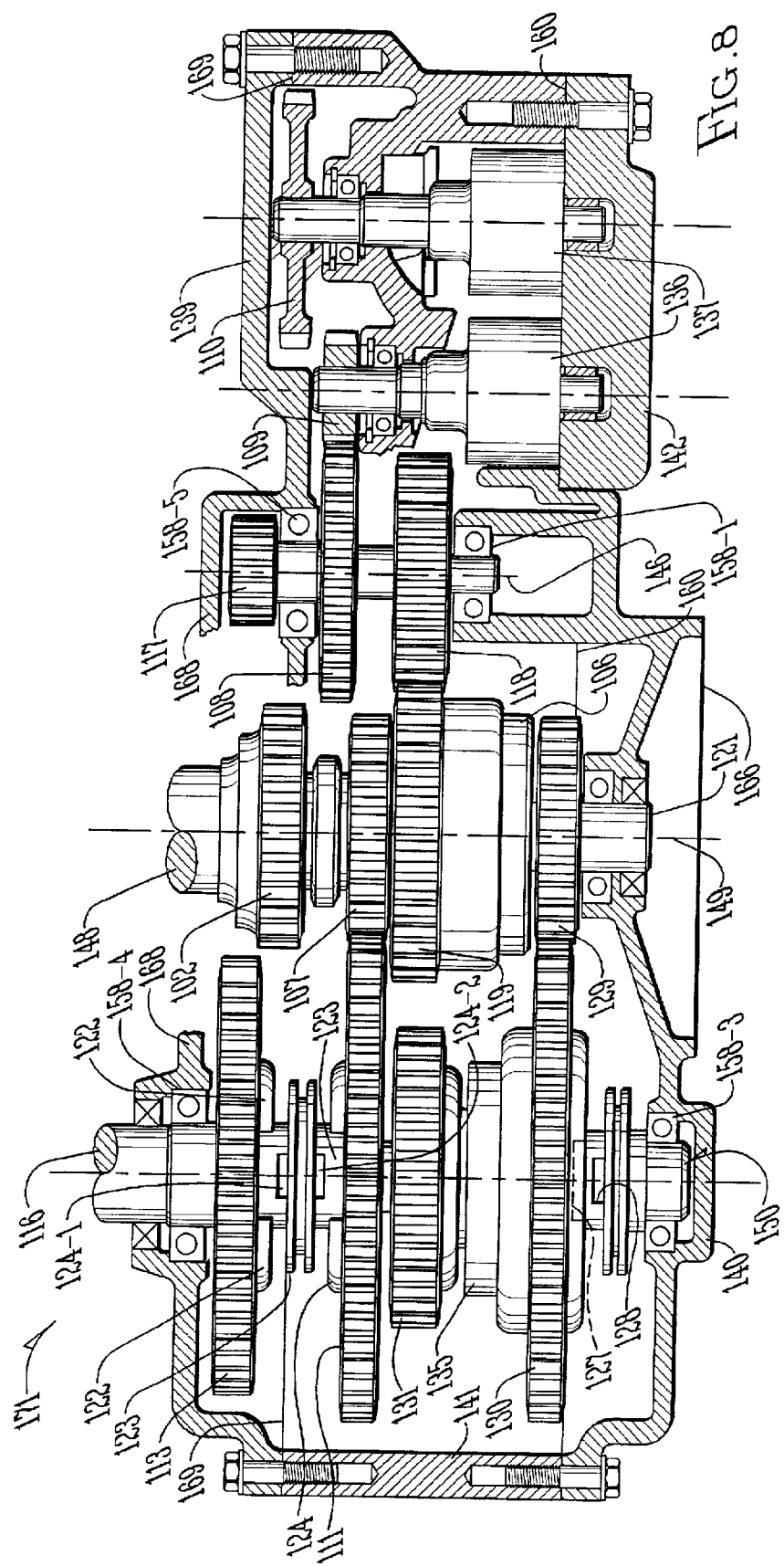
FIG. 8 is a sectional view of the apparatus of the invention.
Figure 9:
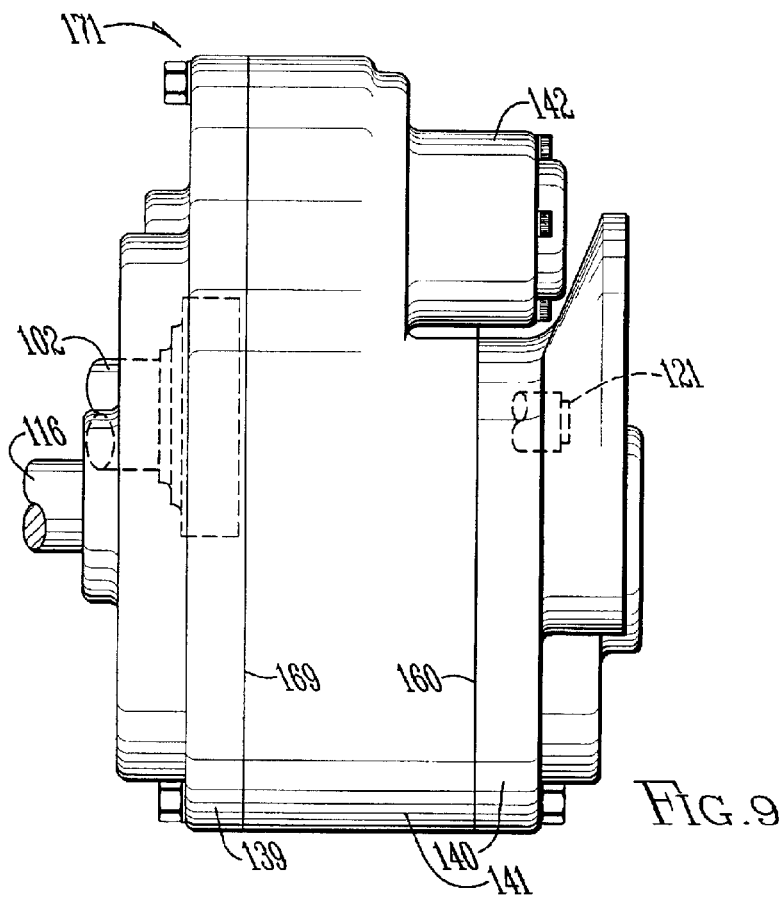
FIG. 9 is a side elevational view thereof.
Figure 10:
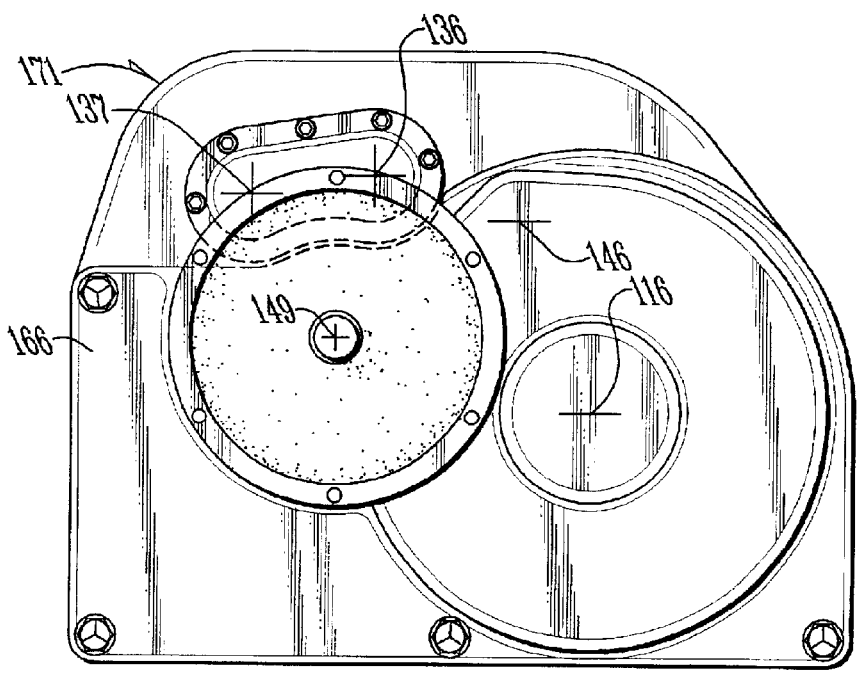
FIG. 10 is a front elevational view thereof as seen from the righthand side of FIG. 9.
Figure 9:
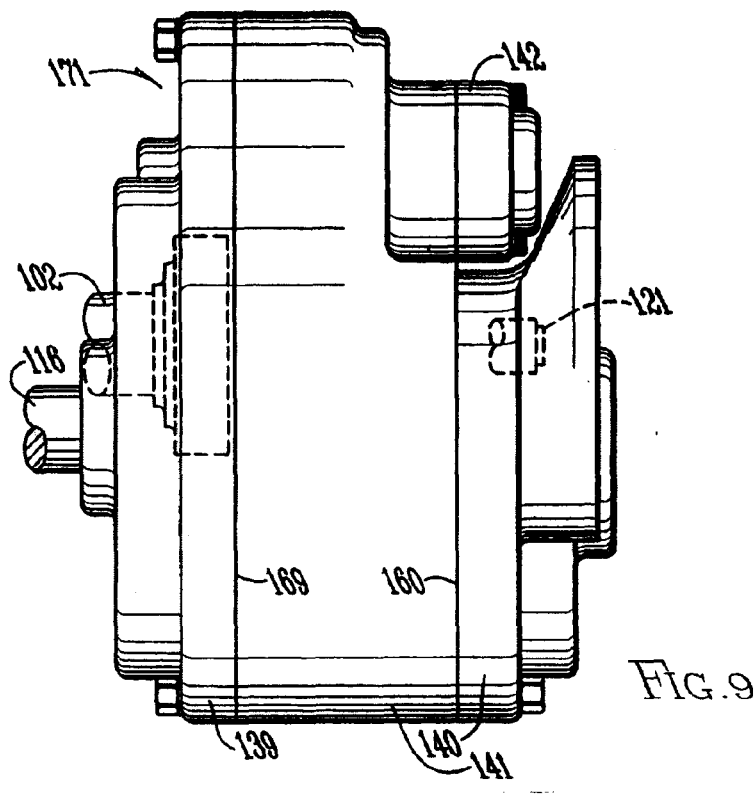
Figure 10:
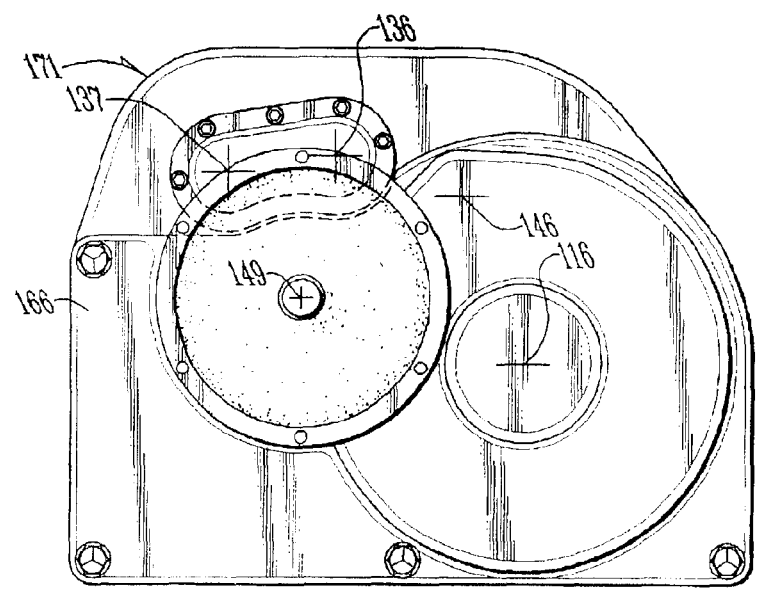

Description of operation: 2-Mode HMT (Refer to FIGS. 3, 4 and 8). Primary component groups are the hydrostatic transmission 51, idler shaft 46, input/planetary 49 and the output assembly 50. In the start-up mode, which is hydrostatic, power from engine 1 travels through shaft 38 to gear set 2/10 into the hydrostatic transmission 51. The V-unit 37 starts at zero stroke and no power is transmitted. As the operator and programmed logic commands, a controller strokes swashplate 57 of V-unit 37. As V-unit 37 is stroked to positive displacement, flow is sent to F-unit 36 through line 43 and rotation of gear set 9/8 starts. Power is delivered to idler shaft 46 and to gear set 17/13. Clutch 1 is connected, which connects tang 24-1 with slot 22, and power flows to output shaft 16 and optional output shaft 12. As V-unit 37 is stroked fully, output 16/12 reaches the maximum forward speed for mode 1. Planetary 49 is inactive in mode 1. The stroke control logic for the V-unit 37 that resides in the controller may be of any type and may be like that described in U.S. Pat. No. 5,560,203.

At the fully stroked position of V-unit 37, all elements of output shaft 16 are at the same nominal speed. A mode change is initiated and clutch 1 and 2 are shifted. When clutch 2 is engaged, tang 24-2 is connected with slot 23 and power is delivered to output shaft 16 through gear set 7/11. Note that power is now being delivered to planetary 49 through gear set 18/19 to ring 5, and through shaft 38 to sun 3, creating parallel power paths. Power is transmitted from both paths to planets 4-1, 4-2 and 4-3 to carrier 6, to gear set 7/11 and to output 50. Because ring 5 is speed controlled by HST 51, a variable speed is controlled at output 50. The controller strokes V-unit 37 from full positive to full negative displacement and output speed delivered through gear set 7/11 to shaft 16 reaches maximum for mode 2.

After the shift of clutch 2, power flows from F-unit 36 to V-unit 37 and the pressure in HST 51 switches to line 44. In the second half of mode 2, V-unit angle strokes over zero to a negative displacement, the power flow is reversed again and is transmitted from V-unit 37 to F-unit 36. The stroke control logic for V-unit 37 is consistent with mode 1. See FIG. 4 for an illustration of transmission 71 output torque, unit 36 speed and HST 51 power flow vs. output speed. Note that continuous power is delivered from the engine to the wheels, with continuous ratio change, from full reverse to full forward speed even though the transmission changes modes at about 25% maximum speed.

Figure 5:
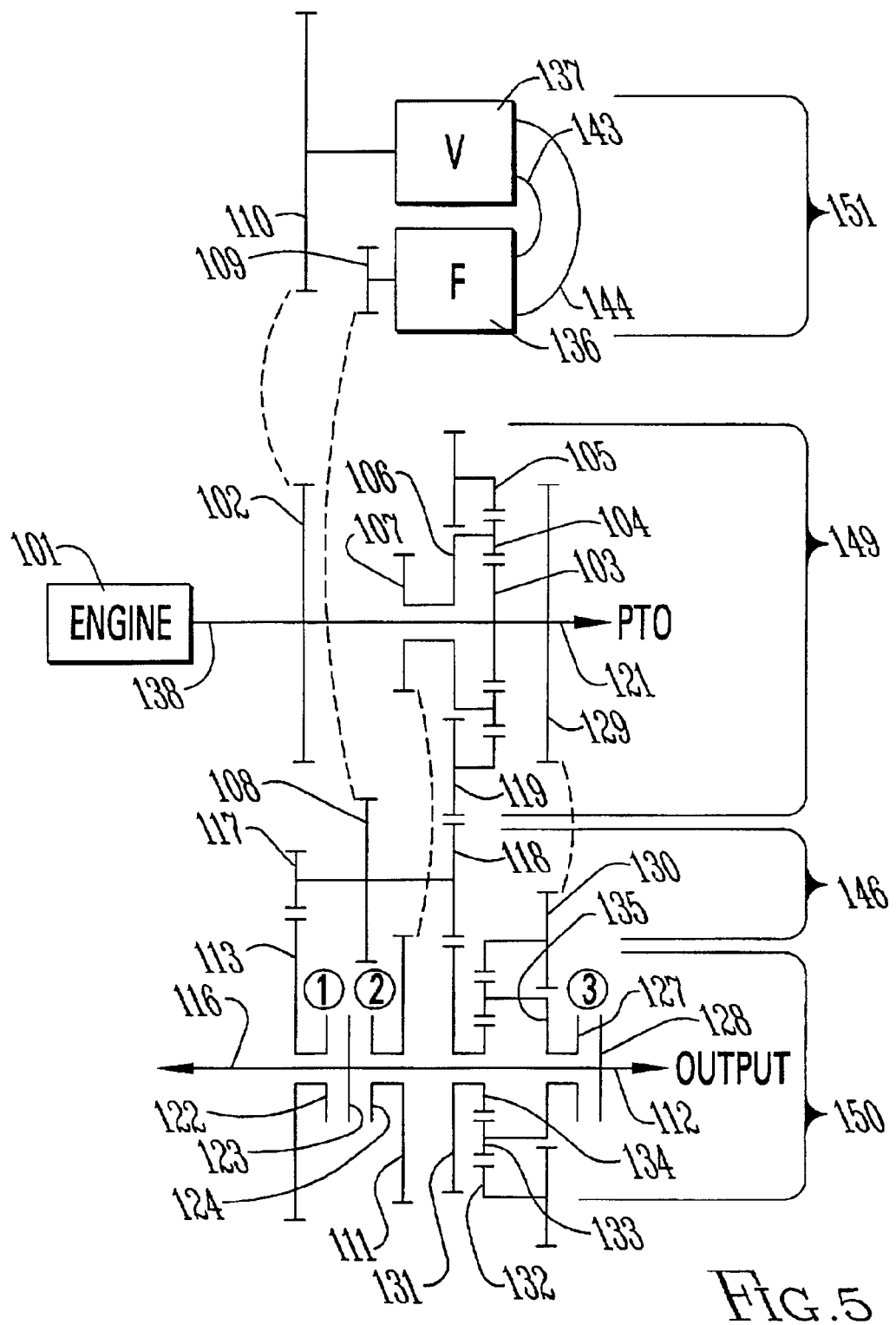
FIG. 5 is a schematic view similar to that of FIG. 3 but showing an alternate operational arrangement.
Figure 6A:
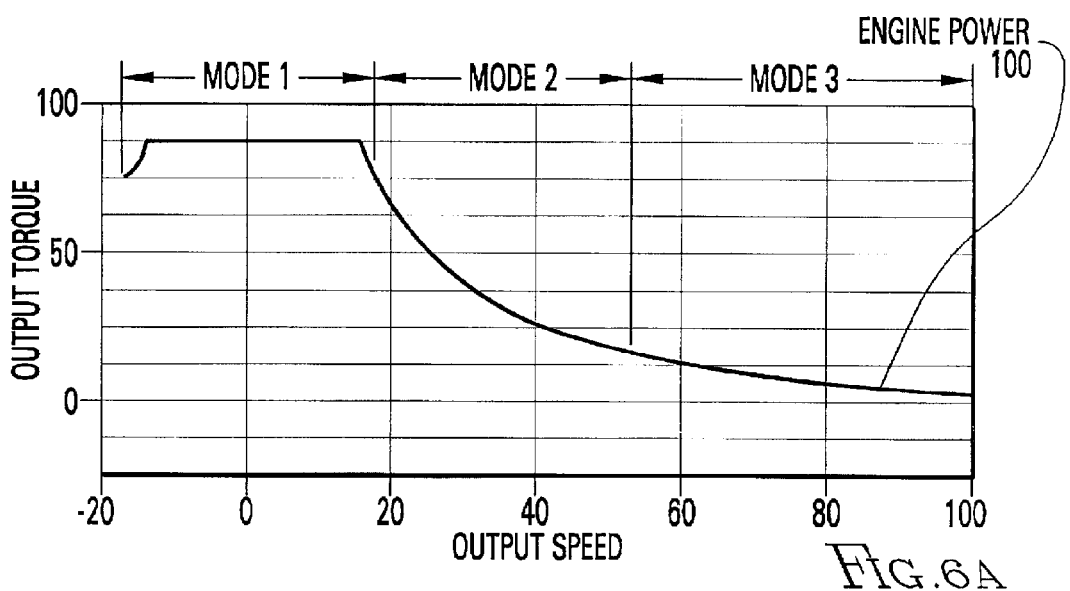
FIGS. 6A–6C are three output torque graphs plotted against output speed, unit speed and power, respectively, as reflected in three different modes of operation.
Figure 6B:
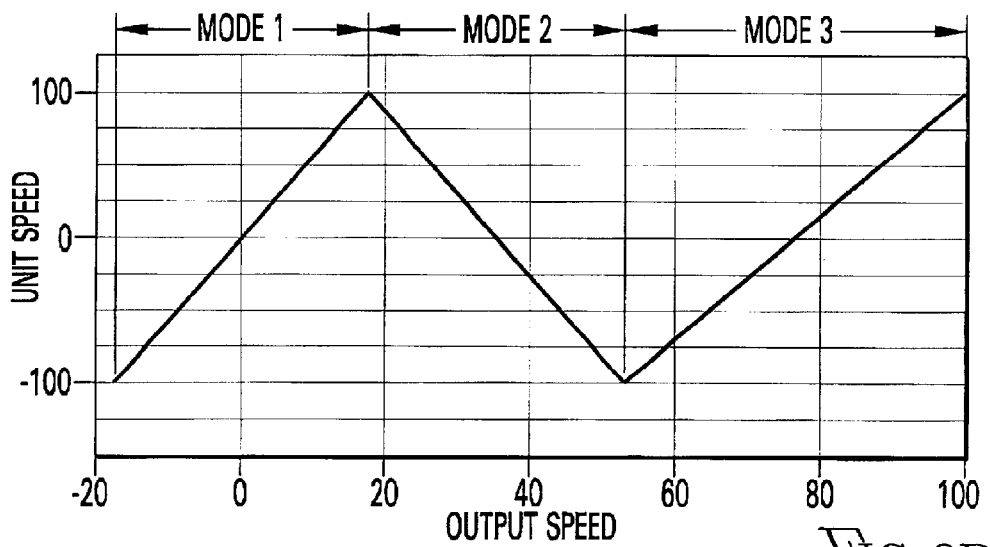
Figure 6C:
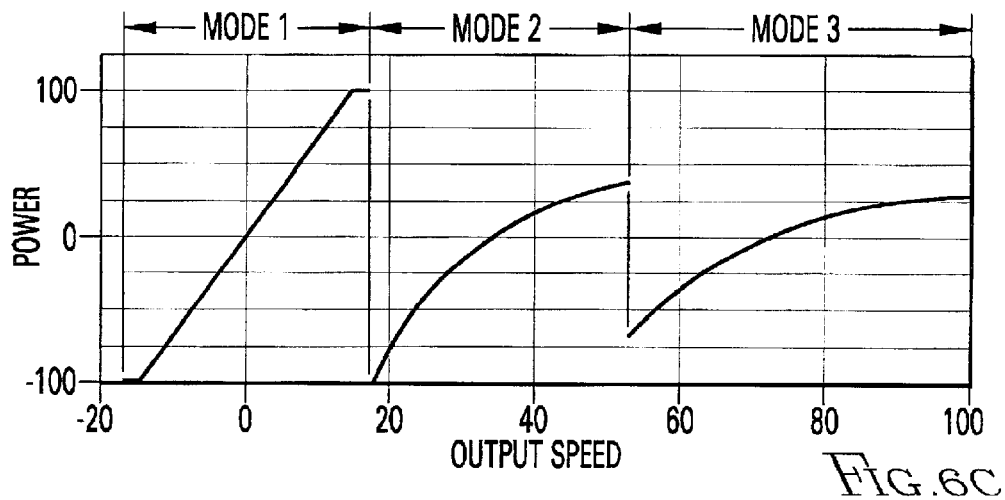

3-Mode HMT (refer to FIGS. 5,6 and 8). The 3-mode HMT is similar to the 2-mode described above with the addition of planetary/gears 150 and the clutch 3. Note that the numbered elements for the 3-mode are the same configuration as the 2-mode with the addition of 100 (i.e.; HST 51 for the 2-mode is HST 151 for the 3-mode). The gear ratios may be different to accommodate different torque/speed ratio spreads. In mode 3, clutch 3 is in engaged that connects carrier 135 to the output shaft 116 through tang 128 to slot 127.

At the end of mode 2, V-unit 137 is fully stroked in a negative direction and HST power is flowing from V-unit 137 to F-unit 136 in line 144. At this condition, all elements of clutch 3 and output shaft 116 are at the same nominal speed. The controller initiates a mode change that moves to engage tang 128 in slot 127 and to disengage tang 124-2 from slot 123 in clutch 2. Gear set 129/130 is driven by the input shaft 138, enabling power flow in planetary 150 through ring 132 and sun 134. As clutch 2 is disengaged, carrier 106 no longer drives the output shaft 116 and turns free, preventing power flow in planetary 149. Note that power to planetary 150 is also delivered through gear sets 118/131 and 109/111 from F-unit 136 to sun 134, creating a parallel power path. The controller strokes V-unit 137 from full negative to full positive displacement, first reducing the speed of F-unit 136 to zero and then increasing it to full positive speed. This allows variable speed from F-unit 136 to regulate sun 134, and a fixed speed from input 138 to determine ring 132 speed, raising output speed to its maximum value.

After the shift of clutch 3, the pressure in HST 151 switches to line 143 and power flows from F-unit 136 to V-unit 137. When V-unit 137 angle strokes over zero to a negative displacement, the power flow is reversed and flows from V-unit 137 to F-unit 136. The stroke control logic for V-unit 137 is consistent with mode 1 and 2. Continuous power is delivered from the engine to the wheels, with continuous ratio change, from full reverse to full forward speed even though the transmission changes modes at about 18% and 54% of maximum speed.

Configuration and Construction: (Refer to FIGS. 4,6,7,8,9 and 10). The hydrostatic transmission 51 (151) is the same for both the three mode and two mode versions. It is sized to provide adequate power for a low power, low ratio transmission in a 2-mode transmission, and for higher power, higher ratio requirements in a three mode transmission. The speeds and planetary ratios can be adjusted to accommodate the various vehicle requirements, over approximately a 2:1 spread in either variable. When individual mode ratio spreads are reduced, input power capacity increases. When modes are added, transmission ratio spread or input power is increased or both, depending on how the gears ratios and planetary ratios are selected. Note the relationship of ratio spread, input power and hydraulic power, and transmission output torque and speed in FIGS. 4 and 6.

The five main functional groups 37 (137), 36 (136), 46 (146), 49 (149), and 50 (150) are all located on a different centerline. In addition to facilitating gear ratio flexibility, this allows the overall transmission length to remain short. Note that moving the gear centerlines to accommodate various vehicle needs for input and output locations may be done with housing 141 unchanged. The planetary 46 (146) and 150 configurations, with the carrier as output, facilitate through drive for the input to PTO and the output for front and rear drive. Having limited functionality on each centerline also facilitates this. Offsetting the output, the V and F units from the input facilitates the output location below and to the side of the engine as well as the short length.

The housing construction supports the ability to alter gear ratios and planetary ratios in a cost efficient manner. (FIGS. 7 and 8) Center housing 141 which is used for all versions, contains the complex design features for the V-unit 137 and F-unit 136, which are the same for all versions of the transmission. Housing 141 would also contain the means to stroke swashplate 57 and for mounting shift sensors. Housing 141 has space and features for the hydraulic reservoir 159. The rear surface 160 of housing 141 is flat and accepts mounting of both manifold 142 and end cover 140. This is accomplished by having the split line 160 in line with the end of units 136 and 137 cylinder block face.

Manifold 142 that contains lines 143 and 144 is the same for all versions and is attached to the rear surface 160 of housing 141. Manifold 142 may also contain other HST circuit elements such as the charge pump charge check valves.

The end covers 139 and 140 contain the bearing supports 158-1, 2, etc. for idler shaft 146, input/planetary 149, planetary/output 150 and output shaft 116, and are adjusted in location to accommodate different shaft centerline locations as gear ratios change and as output shaft locations change. End cover 139 is changeable in configuration to accommodate different engine mounting configurations, including integration with the engine housing. Housing portion 168 may be configured to match with a specific engine housing portion. Split line 169 is flat by placing it near to but outside the bearing support for V-unit 137. In addition to gear ratio differences, end cover 140 is changeable to accommodate either 2-mode or 3-mode transmissions. End cover 140 may also be configured to include the mounting flange 166 for an engine driven PTO 172. Both end cover 139 and 140 form the ends of reservoir 159.

I claim:

1. A compact vehicle having a frame and an operating position thereon for at least one rider, an engine on the frame having a drive shaft, and at least two operational wheels, comprising
   a transmission operatively coupling the engine and the wheels wherein the engine is directly connected to the transmission without a clutch; and
   the transmission being a hydrostatic mechanical transmission (HMT) with at least two operational modes wherein the HMT has a continuous ratio and power flow throughout the entire speed range of the vehicle.

2. The vehicle of claim 1 wherein the vehicle has a normal direction of motion, and the HMT is mounted on the frame so that the power flow of the HMT is in a direction parallel to the normal direction of vehicle motion.

3. The vehicle of claim 1 wherein the vehicle has a normal direction of motion, and the HMT is mounted on the frame so that the power flow of the HMT is in a direction transverse to the normal direction of vehicle motion.

4. A hydrostatic mechanical transmission (HMT), comprising,
   a housing,
   a variable displacement hydrostatic unit and a fixed displacement hydrostatic unit disposed within the housing,
   an input shaft, an output shaft, a planetary gear system and two clutches in the housing which operate together to create two operational modes wherein the planetary gear system is located on a centerline of the input shaft,
   and at least one clutch being located on a centerline of the output shaft.

5. The HMT of claim 4 wherein the planetary gear system includes a planetary carrier connected to the output shaft when the HMT is in a second of two operational modes.

6. The HMT of claim 4 wherein an engine-driven power take-off (PTO) is located on a centerline of the input shaft.

7. The HMT of claim 4 wherein the centerline of the output shaft is located laterally and below the input shaft centerline.

8. The HMT of claim 4 wherein a second planetary gear assembly and a third clutch is associated with the HMT to establish a third operational mode with both the second planetary gear assembly and the third clutch being located on the centerline of the output shaft.

9. The HMT of claim 8 wherein the HMT has a second planetary carrier connected to the output shaft in the third operational mode.

10. A hydrostatic mechanical transmission (HMT), comprising,
    a housing having a central housing enclosure with first and second end covers,
    a variable displacement hydrostatic unit, a fixed displacement hydrostatic unit, and an associated hydraulic manifold in the central housing enclosure,
    at least one planetary gear system and input and output shafts in the central housing enclosure,
    the central housing enclosure having a single flat mounting surface for the hydraulic manifold and the first end cover.

11. The HMT of claim 10 wherein the second end cover mates with the central housing enclosure on a flat mounting surface on an opposite side of the hydraulic manifold.

* * * * *

UNITED STATES PATENT AND TRADEMARK OFFICE
CERTIFICATE OF CORRECTION

PATENT NO. : 6,904,997 B2
DATED : June 14, 2005
INVENTOR(S) : Pollman

It is certified that error appears in the above-identified patent and that said Letters Patent is hereby corrected as shown below:

Delete drawing sheet 9, and substitute therefor drawing sheet 9, as shown on the attached sheet.

Signed and Sealed this

Twenty-third Day of August, 2005

JON W. DUDAS
*Director of the United States Patent and Trademark Office*